United States Patent
Nagai et al.

(10) Patent No.: US 9,789,698 B2
(45) Date of Patent: Oct. 17, 2017

(54) AQUEOUS INK SET, INK JET RECORDING METHOD AND INK JET RECORDING APPARATUS

(71) Applicant: CANON KABUSHIKI KAISHA, Tokyo (JP)

(72) Inventors: Soichi Nagai, Kawasaki (JP); Masashi Ogasawara, Machida (JP); Fumiaki Fujioka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 14/929,687

(22) Filed: Nov. 2, 2015

(65) Prior Publication Data

US 2016/0152849 A1    Jun. 2, 2016

(30) Foreign Application Priority Data

Nov. 28, 2014 (JP) .................... 2014-241113

(51) Int. Cl.
   *B41J 2/01* (2006.01)
   *B41J 2/21* (2006.01)
   (Continued)

(52) U.S. Cl.
   CPC .......... *B41J 2/2107* (2013.01); *B41J 2/1652* (2013.01); *B41J 2/16508* (2013.01); (Continued)

(58) Field of Classification Search
   CPC ... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101;
   (Continued)

(56) References Cited

U.S. PATENT DOCUMENTS 5,750,594 A * 5/1998 Page .................. C09D 11/40
                                                  106/31.76
5,835,116 A    11/1998 Sato et al.
(Continued)

FOREIGN PATENT DOCUMENTS

JP    2003-096367 A    4/2003
JP    2009-515007 A    4/2009
(Continued)

*Primary Examiner* — Manish S Shah
(74) *Attorney, Agent, or Firm* — Fitzpatrick, Cella, Harper & Scinto

(57) ABSTRACT

An aqueous ink set for ink jet including a combination of a first ink and a second ink. The first ink includes a self-dispersible pigment to a particle surface of which a functional group that includes a phosphonic acid group is bonded, wherein the redispersion viscosity of the first ink is 5 mPa·s or less. The second ink includes an anionic dye, a lithium ion, and a sodium ion, wherein the total concentration of the lithium ion and the sodium ion in the second ink is 0.050 mol/L or more, and the proportion of the concentration of the lithium ion in the total concentration of the lithium ion and the sodium ion in the second ink is 45% or more to 85% or less.

14 Claims, 1 Drawing Sheet

(51) Int. Cl.
*C09D 11/322* (2014.01)
*C09D 11/328* (2014.01)
*B41J 2/165* (2006.01)
*C09D 11/40* (2014.01)

(52) U.S. Cl.
CPC ....... *B41J 2/16523* (2013.01); *B41J 2/16526* (2013.01); *B41J 2/16532* (2013.01); *C09D 11/322* (2013.01); *C09D 11/328* (2013.01); *C09D 11/40* (2013.01)

(58) Field of Classification Search
CPC ....... C09D 11/005; C09D 11/54; C09D 11/52; B41M 5/0011; B41M 5/0017; B41M 7/00; B41M 7/0072; B41M 5/52; B41M 5/5218
USPC .................................................. 347/95–108
See application file for complete search history.

(56) References Cited

U.S. PATENT DOCUMENTS

| | | | |
|---|---|---|---|
| 6,027,210 A | | 2/2000 | Kurabayashi et al. |
| 6,187,086 B1 * | | 2/2001 | Rehman ................ C09D 11/30 106/31.28 |
| 6,238,045 B1 | | 5/2001 | Ono et al. |
| 6,398,355 B1 | | 6/2002 | Shirota et al. |
| 6,412,936 B1 | | 7/2002 | Mafune et al. |
| 6,679,598 B2 | | 1/2004 | Kato et al. |
| 6,733,120 B2 | | 5/2004 | Ogasawara et al. |
| 7,005,461 B2 | | 2/2006 | Sanada et al. |
| 7,160,376 B2 | | 1/2007 | Watanabe et al. |
| 7,267,717 B2 | | 9/2007 | Watanabe et al. |
| 7,276,112 B2 | | 10/2007 | Tokuda et al. |
| 7,297,203 B2 | | 11/2007 | Takada et al. |
| 7,371,274 B2 | | 5/2008 | Sanada et al. |
| 7,377,631 B2 | | 5/2008 | Takada et al. |
| 7,601,210 B2 | | 10/2009 | Fujioka et al. |
| 7,605,192 B2 | | 10/2009 | Sanada et al. |
| 7,705,071 B2 | | 4/2010 | Nakagawa et al. |
| 7,753,515 B2 | | 7/2010 | Tokuda et al. |
| 7,806,970 B2 | | 10/2010 | Fujioka et al. |
| 7,883,199 B2 | | 2/2011 | Hakamada et al. |
| 7,909,448 B2 | | 3/2011 | Iwata et al. |
| 8,007,097 B2 | | 8/2011 | Sanada et al. |
| 8,469,504 B2 | | 6/2013 | Saito et al. |
| 8,475,580 B2 | | 7/2013 | Nagai et al. |
| 8,491,715 B2 | | 7/2013 | Gouda et al. |
| 8,672,465 B2 | | 3/2014 | Sanada et al. |
| 8,858,695 B2 | | 10/2014 | Gu et al. |
| 8,899,736 B2 | | 12/2014 | Sanada et al. |
| 8,932,394 B2 | | 1/2015 | Kudo et al. |
| 8,985,755 B2 | | 3/2015 | Fujioka et al. |
| 8,986,435 B2 | | 3/2015 | Saito et al. |
| 8,987,348 B2 | | 3/2015 | Mukae et al. |
| 9,180,680 B2 | | 11/2015 | Sanada et al. |
| 2003/0112305 A1 | | 6/2003 | Kato et al. |
| 2004/0082686 A1 | | 4/2004 | Takahashi et al. |
| 2004/0233263 A1 * | | 11/2004 | Goto ...................... C09D 11/40 347/100 |
| 2007/0100024 A1 | | 5/2007 | Gu et al. |
| 2009/0315961 A1 * | | 12/2009 | Fujioka ................ B41J 2/17513 347/86 |
| 2012/0033009 A1 * | | 2/2012 | Gouda ...................... C09C 1/56 347/20 |
| 2012/0033012 A1 * | | 2/2012 | Nagai .................. C09D 11/324 347/86 |
| 2013/0027463 A1 | | 1/2013 | Ogasawara et al. |

FOREIGN PATENT DOCUMENTS

| | | |
|---|---|---|
| JP | 2012-052095 A | 3/2012 |
| JP | 2012-052097 A | 3/2012 |

* cited by examiner

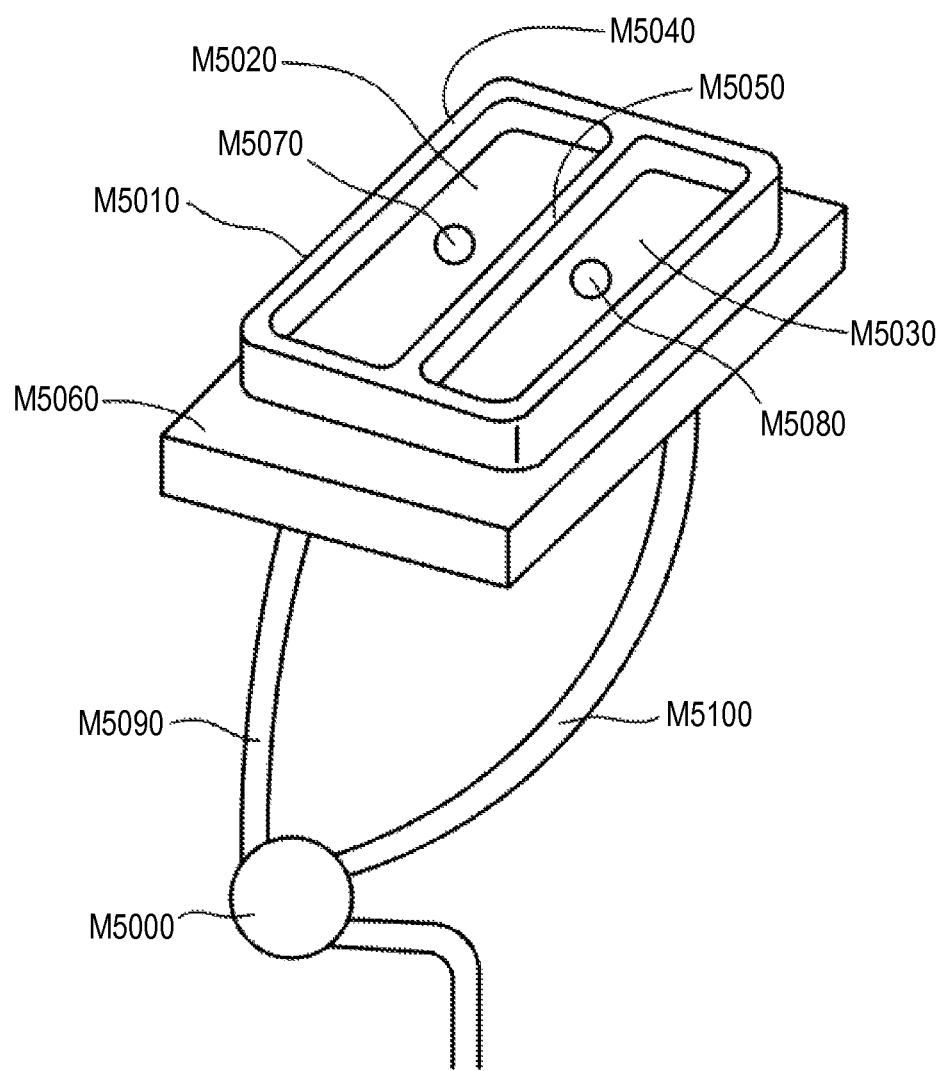

AQUEOUS INK SET, INK JET RECORDING METHOD AND INK JET RECORDING APPARATUS

BACKGROUND OF THE INVENTION

Field of the Invention

The present invention relates to an aqueous ink set, an ink jet recording method and an ink jet recording apparatus.

Description of the Related Art

In recent years, an ink used for an ink jet recording method has been required to furthermore improve optical density and bleeding resistance of an image recorded. Plain paper among recording media includes those of various types with different ink permeabilities. An ink capable of recording an image with both optical density and bleeding resistance at a high level regardless of the type of plain paper is required.

There is a proposal of an ink using a self-dispersible pigment to a particle surface of which a functional group having high reactivity with respect to calcium is bonded and capable of improving the optical density of the resulting image, wherein the functional group is selected on the basis of calcium index which is an index of reactivity with respect to calcium (PCT Japanese National Publication No. 2009-515007). There are also proposals of an ink which contains a self-dispersible pigment to a particle surface of which a functional group containing a phosphonic acid group is bonded and a salt, and is capable of improving the optical density of a resulting image (Japanese Patent Application Laid-Open No. 2012-052095 and Japanese Patent Application Laid-Open No. 2012-052097). There is further a proposal of an ink with improved bleeding resistance by using a self-dispersible pigment whose migration rate measured by paper chromatography has been specified (Japanese Patent Application Laid-Open No. 2003-096367).

The optical density of an image recorded is somewhat improved by using the self-dispersible pigment proposed in PCT Japanese National Publication No. 2009-515007 or the specific salts proposed in Japanese Patent Application Laid-Open No. 2012-052095 and Japanese Patent Application Laid-Open No. 2012-052097. However, results of an investigation by the present inventors have revealed that the bleeding resistance may be insufficient in some cases. In addition, the ink proposed in Japanese Patent Application Laid-Open No. 2003-096367 contains a lot of a highly permeable water-soluble organic solvent, so that the optical density of an image recorded is insufficient. Further, the ink easily retains in a cap for capping a recording head provided in an ink jet recording apparatus. Thus, there has been room for improving the reliability of the ink. The "cap for capping the recording head provided in the ink jet recording apparatus" is also referred to as "cap" merely.

SUMMARY OF THE INVENTION

Accordingly, it is an object of the present invention to provide an aqueous ink set which is capable of recording an image excellent in optical density and bleeding resistance, hard to cause ink retention in the cap and irregular ejection and excellent in reliability. Another object of the present invention is to provide an ink jet recording method and an ink jet recording apparatus using such aqueous ink set.

The above objects can be achieved by the present invention described below. According to the present invention, there is thus provided an aqueous ink set for ink jet comprising a combination of a first ink and a second ink, wherein the first ink contains a self-dispersible pigment to a particle surface of which a functional group containing a phosphonic acid group is bonded, the redispersion viscosity of the first ink as measured according to the following procedure is 5 mPa·s or less, the second ink contains an anionic dye, a lithium ion and a sodium ion, the total concentration of the lithium ion and the sodium ion in the second ink is 0.050 mol/L or more, and the proportion of the concentration of the lithium ion in the total concentration of the lithium ion and the sodium ion in the second ink is 45% or more to 85% or less.

Measurement of redispersion viscosity: After 1.5 g of the first ink is stored for 15 hours under a temperature of 30° C. and a relative humidity of 10%, the first ink is added thereto in an amount of the thus-reduced mass followed by additional storing for 2 hours to thereby measure the viscosity of the resultant.

According to the present invention, there can be provided an aqueous ink set which is capable of recording an image excellent in optical density and bleeding resistance, hard to cause ink retention in the cap and irregular ejection and excellent in reliability. According to another embodiment of the present invention, there can be provided an ink jet recording method and an ink jet recording apparatus using this aqueous ink set.

Further features of the present invention will become apparent from the following description of exemplary embodiments with reference to the attached drawing.

BRIEF DESCRIPTION OF THE DRAWING

FIGURE typically illustrates an exemplary cleaning portion constituting an ink jet recording apparatus according to the present invention.

DESCRIPTION OF THE EMBODIMENTS

Preferred embodiments of the present invention will now be described in detail in accordance with the accompanying drawing. However, the present invention is not limited to the following embodiments. The aqueous ink set may hereinafter be referred to as "ink set" merely. In addition, the self-dispersible pigment to a particle surface of which a functional group containing a phosphonic acid group is bonded may be referred to as "phosphonic acid type self-dispersible pigment". In the present invention, various physical property values are values at 25° C. unless expressly noted.

As a method for recording an image with good optical density and bleeding resistance, a technique making good use of a reaction between plural inks is mentioned. For example, an ink jet recording method in which an ink containing a self-dispersible pigment and a reaction liquid which causes the self-dispersible pigment to aggregate are used in combination is widely known. In addition, various types of reaction are also known as a mode of the reaction. As examples thereof, such an ionic reaction that a polyvalent cationic component such as a polyvalent metal ion is caused to react with an anionic group of the self-dispersible pigment and such a precipitation reaction that a reaction liquid having a low pH which can change the anionic group of the self-dispersible pigment from a dissociation form to an acid form is utilized may be mentioned. However, the technique making good use of the reaction causes a reaction not only on a recording medium but also in a minute ink droplet (mist) produced upon ejection of the ink and the reaction liquid. In this case, a reaction product adheres to a recording head, thereby causing a drawback such as lowering of ejection characteristics (stability). Such a problem of complication of an apparatus that a member for avoiding such drawback problem is provided is raised.

Thus, the present inventors have carried out an investigation about an ink using the phosphonic acid type self-dispersible pigment as a coloring material without using the reaction liquid for improving the optical density and bleeding resistance without causing a strong reaction. As a result, it has been found that an aqueous ink containing the phosphonic acid type self-dispersible pigment greatly varies the degree of viscosity increase of the ink due to evaporation of water and the bleeding resistance of an image recorded, according to the kind of a coexisting monovalent cation. An alkali metal ion or ammonium ion is used as the monovalent cation. It has been found that when a lithium ion whose ionic radius is small among alkali metal ions is used, the bleeding resistance is most improved, and moreover the viscosity increase of the ink due to the evaporation of water becomes great. In other words, it has been found that the viscosity of the ink containing the phosphonic acid type self-dispersible pigment and the bleeding resistance of the image are susceptible to the influence of the monovalent cation coexisting with the phosphonic acid type self-dispersible pigment.

In order to improve the bleeding resistance of the image, it is important to accelerate aggregation of a pigment on a recording medium. On the other hand, in order to inhibit the ink retention in the cap and the irregular ejection caused by mixing of mists of the first ink and the second ink, it is important to inhibit the aggregation of the pigment. In short, a trade-off exists between the improvement in image characteristics and the improvement in ink reliability. The aggregation of the pigment on the recording medium is accelerated by evaporation of water and solid-liquid separation after the ink is applied to the recording medium and by an interaction between a phosphonic acid group contained in a functional group and calcium contained as a filler in the recording medium. On the other hand, in order to inhibit the ink retention in the cap and the irregular ejection, it is only necessary to inhibit the aggregation of the pigment in such a state that water is contained to some extent though the evaporation of water proceeds without the need of considering the presence of calcium. In other words, regarding these two phenomena, it is only necessary to consider acceleration/inhibition of the aggregation of the pigment in different states of the ink from the viewpoint of water and calcium. Thus, a method for improving both image characteristics and ink reliability at the same time has been investigated.

As the result of the investigation, the present inventors have found the constitution of an ink set which is capable of recording an image excellent in optical density and bleeding resistance and hard to cause the ink retention in the cap and the irregular ejection. In other words, the ink set according to the present invention is an aqueous ink set for ink jet which uses a first ink and a second ink in combination. The first ink contains a self-dispersible pigment to a particle surface of which a functional group containing a phosphonic acid group is bonded, and the redispersion viscosity of the first ink as measured according to the prescribed procedure is 5 mPa·s or less. In addition, the second ink contains an anionic dye, a lithium ion and a sodium ion. The total concentration of the lithium ion and the sodium ion in the second ink is 0.050 mol/L or more, and the proportion of the concentration of the lithium ion in the total concentration of the lithium ion and the sodium ion in the second ink is 45% or more and to 85% or less. The present inventors presume a reason why the above-described effect is achieved by adopting the above constitution to be as follows.

A reason why the bleeding resistance of an image recorded is improved is presumed to be as follows. As described above, the ink containing the phosphonic acid type self-dispersible pigment greatly increases the viscosity thereof after evaporation of water when the lithium ion is present. This fact is not so recognized for an ink containing a carboxylic acid type self-dispersible pigment or a sulfonic acid type self-dispersible pigment. The phosphonic acid type self-dispersible pigment is very sensitive to a cation and susceptible to the influence of the cation when the surrounding environment is changed by evaporation of water or the like. In particular, when an alkali metal ion with high hydration force such as a lithium ion or sodium ion is present in the vicinity of the phosphonic acid type self-dispersible pigment, a water molecule by which the dispersion state of the pigment is stabilized is deprived. Therefore, the water molecule is locally lessened compared with a case where another alkali metal ion is present, so that the aggregation of the pigment is more accelerated. In addition, the viscosity increase of the ink is more remarked when water is evaporated.

When the second ink containing the lithium ion and the sodium ion comes into contact with the first ink, water is drawn from the first ink to the second ink by the hydration force of the lithium ion and the sodium ion. Therefore, the aggregation of the phosphonic acid type self-dispersible pigment in the first ink is more accelerated, and thus the bleeding resistant of the resulting ink is improved. In addition, the ink containing the phosphonic acid type self-dispersible pigment is easily destabilized when the surrounding environment is changed by evaporation of water or the like, so that the lithium ion and the sodium ion are contained in the second ink. In order to improve the bleeding resistance, the total concentration of the lithium ion and the sodium ion in the second ink is required to be 0.050 mol/L or more. If the total concentration of the lithium ion and the sodium ion in the second ink is less than 0.050 mol/L, the bleeding resistance of the image is not improved.

A reason why the ink retention in the cap is inhibited is presumed to be as follows. In order to inhibit the ink retention in the cap, it is important to reduce the redispersion viscosity of the first ink to 5 mPa·s. The redispersion viscosity of the first ink means a viscosity measured in the following manner. After 1.5 g of the first ink is stored for 15 hours under a temperature of 30° C. and a relative humidity of 10%, the first ink is added thereto in an amount of the thus-reduced mass followed by additional storing for 2 hours to thereby measure the viscosity of the resultant. At this time, as a container in which the ink is put, an open type container such as a Petri dish may be used. In addition, the viscosity is favorably measured after the ink stored is stirred. Incidentally, the conditions of a temperature of 30° C. and a relative humidity of 10% are conditions under which evaporation of the ink easily rapidly proceed compared with normal temperature and normal humidity such as a temperature of 25° C. and a relative humidity of 50%. When the ink is stored for 15 hours under such conditions, the ink becomes in such a state that the evaporation thereof has considerably proceed. When the redispersion viscosity of the ink is low to such an extent as to satisfy 5 mPa·s or less under such severe conditions, the ink retention in the cap can be effectively inhibited.

The redispersion viscosity is a physical value which can be an index indicating compatibility in the situation where after unnecessary ink (waste ink) is dried, the unnecessary ink is further discharged. The present inventors have found that the ink retention in the cap can be inhibited when the redispersion viscosity of the first ink is 5 mPa·s or less. Since the phosphonic acid type self-dispersible pigment is susceptible to the influence of change of the surrounding environment due to evaporation of water or the like, its redispersion viscosity is easily increased compared with another self-dispersible pigment such as a carboxylic acid type pigment. For example, in the case of an ink containing a phosphonic acid type self-dispersible pigment, its redispersion viscosity changes depending on pH, viscosity, total content of water-soluble organic solvents, presence or absence of resins and addition amount of metal salts (salt of a monovalent cation or a polyvalent cation). Therefore, the redispersion viscosity of the first ink can be controlled to be 5 mPa·s or less by suitably controlling kinds thereof or amounts used. For example, when a water-soluble organic solvent, a resin and a metal salt are used, the redispersion viscosity of the first ink is easily lowered by reducing the contents thereof.

When an ink containing a phosphonic acid type self-dispersible pigment and an ink containing an anionic dye are used in combination, irregular ejection of the inks may occur in some cases. A minute ink droplet (mist) is produced when an ink is ejected from a recording head of an ink jet system. Ejecting directions of the ink is shifted due to a thickened product produced by contact of mists of the inks, and so irregular ejection of the inks occurs. According to the ink set of the present invention, the irregular ejection of the ink is inhibited without impairing the bleeding resistance when the proportion of the concentration of the lithium ion in the total concentration of the lithium ion and the sodium ion in the second ink is controlled to be 45% or more to 85% or less.

Ink Set:

The ink set according to the present invention is an aqueous ink set for ink jet which uses a first ink and a second ink in combination. As for the modes of the ink set, (i) a set of plural ink cartridges separately containing the respective inks and (ii) an ink cartridge integrally formed by combining plural ink storage portions separately containing the respective inks may be mentioned. However, the ink set according to the present invention is not limited to the above modes (i) and (ii) so long as the set is formed in such a manner that the first ink and the second ink can be used in combination. In addition, the ink set may contain any other ink than the first ink and the second ink.

First Ink

The first ink contains, as a coloring material, a self-dispersible pigment to a particle surface of which a functional group containing a phosphonic acid group is bonded. In addition, the redispersion viscosity of the first ink is 5 mPa·s or less. As described above, the redispersion viscosity can be controlled by the total content of water-soluble organic solvents, presence or absence of resins and addition amount of metal salts.

As examples of the kind of the pigment, there may be mentioned organic pigment and inorganic pigments such as carbon black, and any pigment may be used so long as it is usable for ink jet inks. The first ink constituting the ink set according to the present invention is favorably a black ink using carbon black as the pigment. The content (% by mass) of the pigment in the first ink is favorably 0.10% by mass or more to 15.00% by mass or less, more favorably 1.00% by mass or more to 10.00% by mass or less based on the total mass of the ink.

Self-Dispersible Pigment

The pigment used in the first ink is a phosphonic acid type self-dispersible pigment to a particle surface of which a functional group containing a phosphonic acid group is bonded. The self-dispersible pigment is used as the coloring material, whereby the addition of a dispersant for dispersing the pigment in the ink, such as a resin, can be unnecessary, or the amount of the dispersant added can be lessened.

In the first ink, the phosphonic acid group $-PO(O[M_1])_2$ may be in any state of a partially dissociated state and a wholly dissociated state. In short, the phosphonic acid group may take any form of $-PO_3H_2$ (acid form) $-PO_3H^-M_1^+$ (monobasic salt) and $-PO_3^{2-}(M_1^+)_2$ (dibasic salt). Here, $M_1$ is at least one selected from the group consisting of an alkali metal, ammonium and organic ammonium. In the present invention, $M_1$ is favorably selected from a sodium ion, a potassium ion and an ammonium ion. In other words, a counter ion of the functional group bonded to the particle surface of the self-dispersible pigment favorably contains at least one of the sodium ion, the potassium ion and the ammonium ion. When $M_1$ is only a lithium ion, however, the redispersion viscosity tends to be increased, and it is difficult to inhibit the retention in the cap and the irregular ejection at a high level. The first ink may contain a lithium ion and a sodium ion. However, such ions are favorably contained not so much since the viscosity tends to be increased.

The phosphonic acid type self-dispersible pigment is such a bisphosphonic acid type self-dispersible pigment that the functional group bonded to the particle surface thereof contains two phosphonic acid groups. Quite naturally, the optical density of an image can be improved even when such a monophosphonic acid type self-dispersible pigment that the functional group bonded to the particle surface thereof contains one phosphonic acid group is used. When the bisphosphonic acid type self-dispersible pigment is used, an image with the more improved optical density can be recorded. Incidentally, when such a trisphosphonic acid type self-dispersible pigment that the functional group bonded to the particle surface thereof contains three phosphonic acid groups is used, the storage stability of the resulting ink may be somewhat lowered in some cases.

The phosphonic acid group contained in the functional group bonded to the particle surface of the self-dispersible pigment is favorably located at a terminal of the functional group. In other words, another atomic group is favorably present between the particle surface of the pigment and the phosphonic acid group. As examples of such another atomic group ($-R-$), there may be mentioned linear or branched alkylene groups having 1 to 12 carbon atoms, arylene groups such as a phenylene and naphthylene groups, an amide group, a sulfonyl group, an amino group, an imino group, a carbonyl group, an ester group, an ether group and groups composed of combination of these groups. Said another atomic group favorably contains at least one of the alkylene groups and the arylene groups and a group having hydrogen bonding property (amide, sulfonyl, amino, imino, carbonyl, ester or ether group). In addition, the functional group favorably contains a structure of $-C_6H_4-SO_2-NH-$ or a structure of $-C_6H_4-CONH-$.

The functional group bonded to the particle surface of the self-dispersible pigment favorably contains a structure of $-CQ(PO_3[M_1]_2)_2$. Here, Q in the formula is a hydrogen atom, R, OR, SR or $NR_2$, and R is a hydrogen atom, or an alkyl, acyl, aralkyl or aryl group. When R is a carbon-atom-containing group, the number of carbon atoms contained in that group is favorably 1 to 18. As examples of the alkyl group, there may be mentioned methyl and ethyl groups. As examples of the acyl group, acetyl and benzoyl groups may be mentioned. As examples of the aralkyl group, may be mentioned a benzyl group. As examples of the aryl group, may be mentioned phenyl and naphthyl groups. $M_1$ is at least one selected from the group consisting of a hydrogen atom, an alkali metal, ammonium and organic ammonium. The functional group bonded to the particle surface of the self-dispersible pigment particularly favorably contains a structure represented by —C(OH) (PO$_3$[M$_1$]$_2$)$_2$ in which Q in the above formula is OH or a structure represented by —CH(PO$_3$[M$_1$]$_2$)$_2$ in which Q in the above formula is a hydrogen atom. The overall molecular weight of the functional group bonded to the particle surface of the self-dispersible pigment (molecular weight calculated with the phosphonic acid group as a free acid form) is favorably 1,500 or less, more favorably 1,000 or less.

Introduced amount of functional group The introduced amount of the functional group bonded to the particle surface of the self-dispersible pigment is 0.08 mmol/g or more to 0.33 mmol/g or less. Incidentally, the unit of the introduced amount of functional group is the number of millimoles of the functional group per 1 g of pigment solid content.

The introduced amount of functional group can be measured by determining the quantity of phosphorus according to the following procedure. A pigment dispersion liquid is first diluted with pure water in such a manner that the content (solid content) of the pigment is about 0.03% by mass to prepare a liquid A. The pigment dispersion liquid is then ultracentrifuged under conditions of 5° C., 80,000 rpm and 15 hours to collect a supernatant liquid from which the phosphonic acid type self-dispersible pigment has been removed, and this liquid is diluted about 80 times with pure water to prepare a liquid B. With respect to the thus prepared liquids A and B, the quantity of phosphorus is determined by means of an ICP emission spectral analyzer, and the amount of the phosphonic acid group is determined from a difference in the amount of phosphorus in the liquids A and B. The introduced amount of functional group can be calculated according to (amount of the phosphonic acid group)/n (n denotes the number of phosphonic acid groups contained in one functional group, and is 1 for mono, 2 for bis or 3 for tris). When the number of phosphonic acid groups contained in the functional group can be known by analyzing the structure thereof by NMR. Incidentally, the method for measuring the introduced amount of functional group using the pigment dispersion liquid is described above. However, the measurement can be made likewise by using an ink. The measuring method of the introduced amount of functional group is not limited to the method described above.

Second ink The second ink contains an anionic dye, a lithium ion,. and a sodium ion. The total concentration of the lithium ion and the sodium ion in the second ink is 0.050 mol/L or more, and the proportion of the concentration of the lithium ion in the total concentration of the lithium ion and the sodium ion in the second ink is 45% or more to 85% or less. The second ink may contain any other monovalent cation than the lithium ion and the sodium ion. As examples of the other monovalent cation, there may be mentioned potassium, ammonium, and organic ammonium ions. Incidentally, the inks constituting the ink set according to the present invention are aqueous inks. Therefore, the unit (mmol/L) of the concentration in the present invention is calculated with the specific gravity of each ink as "1 g/cm$^3$". Each cation concentration in the ink can be measured by means of an ICP emission spectral analyzer or an ion chromatographic analyzer.

If the total concentration of the lithium ion and the sodium ion in the second ink is less than 0.050 mol/L, the bleeding resistance is not improved. In addition, if the proportion of the concentration of the lithium ion in the total concentration of the lithium ion and the sodium ion in the second ink is less than 45%, or if the second ink does not contain the lithium ion, a dissolved state of the anionic dye is destabilized. Therefore, the irregular ejection cannot be inhibited. If the proportion of the concentration of the lithium ion in the total concentration of the lithium ion and the sodium ion in the second ink is more than 85%, on the other hand, a thickened product tends to occur upon contact of the first ink with the second ink due to the lithium ion high in hydration force. Therefore, the irregular ejection cannot be inhibited.

The total concentration of the lithium ion and the sodium ion in the second ink is favorably 0.200 mol/L or less. In addition, the total concentration of monovalent cations in the second ink is favorably 0.400 mol/L or less. If the total concentration of the lithium ion and the sodium ion is more than 0.200 mol/L, or if the total concentration of the monovalent cations is more than 0.400 mol/L, the irregular ejection may not be inhibited sufficiently at a high level in some cases. The total concentration of the monovalent cations in the second ink is favorably 0.050 mol/L or more.

In order to allow a monovalent cation of desired kind and concentration to be contained in the second ink, for example, such a component as an anionic dye or a salt may be used. In other words, a counter ion of an anionic dye can be contained as the monovalent cation in the second ink. Alkali metal ions such as lithium, sodium and potassium ions and an ammonium ion are favorable as the monovalent cations. In addition, a salt formed by combining a monovalent cation with an anion is favorably used as the salt. Among others, at least a part of the monovalent cation is favorably contained as the counter ion of the anionic dye in the second ink. Incidentally, these salts may be contained in the first ink.

As specific examples of the monovalent cation, there may be mentioned alkali metal ions, ammonium ion and organic ammonium ions. In addition, as specific examples of the anion, there may be mentioned Cl$^-$, Br$^-$, I$^-$, ClO$^-$, ClO$_2^-$, ClO$_3^-$, ClO$_4^-$, NO$_2^-$, NO$_3^-$, SO$_4^{2-}$, CO$_3^{2-}$, HCO$_3^-$, HCOO$^-$, (COO$^-$)$_2$, COOH(COO$^-$), CH$_3$COO$^-$, C$_2$H$_4$(COO$^-$)$_2$, C$_6$H$_5$COO$^-$, C$_6$H$_4$(COO$^-$)$_2$, PO$_4^{3-}$, HPO$_4^{2-}$ and H$_2$PO$_4^-$. These monovalent cations and anions may be respectively used either singly or in any combination thereof.

The second ink contains an anionic dye as a coloring material. The anionic dye is a dye having an anionic group (such as carboxylic acid group and sulfonic acid group) as a solubilizing group to an aqueous medium, and any dye generally usable for ink jet inks may be used. The anionic dye favorably has such a skeleton as an azo, phthalocyanine, quinacridone, anthrapyridone, xanthene or triphenylmethane. In addition, the anionic dye may be used either singly or in any combination thereof. The number of anionic groups that the anionic dye has is favorably 1 or more to 10 or less, more favorably 2 or more to 6 or less per molecule. When the monovalent cation is caused to be contained in the second ink by using the counter ion of an anionic dye, an anionic dye having anionic groups within the above range is used, whereby the cation concentration can be easily controlled to be a proper concentration. In the present invention, a chromatic ink having a hue such as cyan, magenta, yellow, red, blue or green, i.e., color ink, is favorably used as the second ink. Therefore, a dye having such a hue is favorably used as the anionic dye. The content (% by mass) of the anionic dye in the second ink is favorably 0.10% by mass or more to 10.00% by mass or less, more favorably 1.00% by mass or more to 6.00% by mass or less based on the total mass of the ink.

It is favorable that the content x (% by mass) of the self-dispersible pigment in the first ink and the total concentration (mol/L) M of the lithium ion and the sodium ion in the second ink satisfy the relation of the following expression (1). x and M satisfy the expression (1), whereby the bleeding resistance of an image recorded can be more improved. The value represented by "x/M" is favorably 15 or more. It is particularly favorable that the introduced amount of functional group of the self-dispersible pigment is 0.08 mmol/g or more to 0.33 mmol/g or less, and x/M is 15 or more to 65 or less. The content of the self-dispersible pigment in the ink can be measured by a thermogravimetric analysis or an absorptiometric method.

$$x/M \leq 65 \qquad \ldots (1)$$

In the present invention, the interaction (hydration force of the monovalent cations) between the inks upon occurrence of evaporation of water is utilized in order to improve the optical density and the bleeding resistance without causing a strong reaction such as an ionic reaction or a precipitation reaction to avoid lowering of the ejection property caused by the reaction between the mists. Accordingly, the second ink does not need to have such properties that an ionic reaction caused by a polyvalent metal ion or the like or a precipitation reaction caused by lowering of pH is caused. Thus, a polyvalent cation such as a polyvalent metal ion may not be contained in the second ink, or there is no need to set the pH of the second ink too low. Specifically, the content of the polyvalent cation such as the polyvalent metal ion in the second ink is favorably 100 ppm or less, more favorably 10 ppm or less in the present invention. In addition, the pH of the second ink is favorably 5 or more to 9 and less, more favorably 6 or more to 9 or less.

Aqueous medium The respective inks constituting the ink set according to the present invention favorably contain an aqueous medium which is a mixed solvent of water and a water-soluble organic solvent. Deionized water is favorably used as water. The content (% by mass) of water in the ink is favorably 30.00% by mass or more to 95.00% by mass or less based on the total mass of the ink. In addition, the content (% by mass) of the water-soluble organic solvent in the ink is favorably 3.00% by mass or more to 50.00% by mass or less based on the total mass of the ink. As the water-soluble organic solvent, any of those usable for ink jet inks, such as alcohols, glycols, glycol ethers and nitrogen-containing compounds may be used. In the present invention, at least a polyhydric alcohol such as glycerol, a nitrogen-containing compound such as 2-pyrrolidone and an alkylene glycol such as triethylene glycol are favorably used. These water-soluble organic solvents may be used either singly or in any combination thereof.

In order to prevent the redispersion viscosity from being too high, the content (% by mass) of the water-soluble organic solvent in the first ink is favorably 25.00% by mass or less based on the total mass of the ink. If the content of the water-soluble organic solvent in the first ink is more than 25.00% by mass, the degree of inhibition of the deposition of the ink may be somewhat lowered in some cases. In addition, the content (% by mass) of water in the first ink is favorably 40.00% by mass or more to 95.00% by mass or less based on the total mass of the ink.

Other Additives The respective inks constituting the ink set according to the present invention may contain water-soluble organic compounds which are solid at ordinary temperature, such as urea and derivatives thereof, trimethylolpropane, and trimethylolethane, in addition to the above-described components. In the present invention, at least trimethylolpropane is favorably used. The content (% by mass) of the water-soluble organic compound which is solid at ordinary temperature in the ink is favorably 0.10% by mass or more to 20.00% by mass or less, more favorably 3.00% by mass or more to 10.00% by mass or less based on the total mass of the ink. Incidentally, the water-soluble organic compounds which are solid at ordinary temperature, such as urea and derivatives thereof, trimethylolpropane, and trimethylolethane, tend to increase the redispersion viscosity of the ink like the water-soluble organic solvent. Thus, when the redispersion viscosity is controlled with the relation with respect to the total content of the water-soluble organic solvents, it is favorable to consider it with the content of these solid water-soluble organic compounds included in the content of the water-soluble organic solvents.

In addition, the respective inks constituting the ink set according to the present invention may also contain various additives such as a surfactant, a resin, a pH adjustor, an antifoaming agent, a rust preventive, a preservative, a mildewproofing agent, an antioxidant, an antireductant and a chelating agent, as needed. Among others, a nonionic surfactant is favorably used, and an acetylene-glycol-based surfactant or a polyoxyethylene alkyl ether is more favorably used.

Physical properties of inks Physical properties of the respective inks constituting the ink set according to the present invention are favorably controlled within the following respective ranges. The viscosity at 25° C. of each ink is favorably 1.0 mP·s or more to 4.0mP·s or less, more favorably 1.0 mP·s or more to 3.0 mP·s or less. The static surface tension at 25° C. of each ink is favorably 28 mN/m or more to 45 mN/m or less. The pH at 25° C. of the first ink is favorably 5 or more to 9 or less, and the pH at 25° C. of the second ink is favorably 6 or more to 9 or less.

Ink Jet Recording Method and Ink Jet Recording Apparatus:

The ink jet recording method according to the present invention has a step of ejecting an ink from an ejection orifice of a recording head of an ink jet system to record an image on a recording medium, and a step of capping the ejection orifice with a cap. An ink included in the aqueous ink set according to the present invention is used as the ink. In addition, the ink jet recording apparatus according to the present invention is provided with an ink storage portion within which an ink is stored, a unit for ejecting the ink from an ejection orifice of a recording head of an ink jet system to record an image on a recording medium and a cap for capping the ejection orifice. An inks included in the aqueous ink set according to the present invention are used as the ink. As for systems for ejecting the ink, a system in which mechanical energy is applied to the ink and a system in which thermal energy is applied to the ink may be mentioned. Among others, the system in which thermal energy is applied to the ink is favorably adopted. Steps of the ink jet recording method and units which are provided in the ink jet recording apparatus may be those publicly known except that inks included in the aqueous ink set according to the present invention are used.

The construction of the cap which caps (covers) the ejection orifice of the recording head in the ink jet recording method and ink jet recording apparatus according to the present invention will hereinafter be described. Incidentally, in the following description, (one) ejection orifice is described for the sake of brevity. However, a plurality of ejection orifices are generally provided for ejecting one ink in the ink jet recording apparatus, and the plural ejection orifices are arranged, thereby forming an ejection orifice array. Since the aqueous ink set according to the present invention has at least two inks, two or more rows of the ejection orifice array are provided.

FIGURE typically illustrates an exemplary cleaning portion constituting the ink jet recording apparatus according to the present invention. In the cleaning portion, a cap M5010 is brought into contact with a face having an ejection orifice of a recording head (not illustrated) to cap the ejection orifice, whereby evaporation of the ink can be inhibited. More specifically, a cap holder M5060 is lifted by a vertically driving mechanism not illustrated to bring the cap M5010 into contact under proper contact force with the face having the ejection orifice of the recording head, thereby conducting capping. When a pump M5000 is actuated in the capped state, a negative pressure is generated between the face having the ejection orifice and the cap M5010. The ink is sucked from the ejection orifice through tubes M5090 and M5100 respectively connected to suction ports M5070 and M5080 by this negative pressure, whereby cleaning of the recording head is conducted. The ink is ejected (preliminarily ejected) toward suction chambers M5020 and M5030, or the ink present on the cap M5010 is sucked under the state where the cap is opened, whereby sticking of the ink on the recording head and other problems can be inhibited. An ink absorbing member may also be provided in the interior of each suction chamber.

As described above, the construction in which a suction chamber formed by a peripheral wall portion M5040 is partitioned into two suction chambers M5020 and M5030 having an equal volume by a partition wall M5050 is illustrated in FIGURE. However, the volumes of these suction chambers may be different from each other, or one suction chamber may be formed without providing the partition wall. The cap may be so constructed that ejection orifice arrays respectively ejecting a plurality of inks are capped collectively with one cap, or caps may be provided corresponding to the respective ejection orifice arrays ejecting the plurality of the inks.

EXAMPLES

The present invention will hereinafter be described in more detail by the following Examples and Comparative Examples. However, the present invention is not limited by the following examples unless going beyond the gist of the present invention. Incidentally, all designations of "part" or "parts" and "%" regarding the amounts of components are based on mass unless expressly noted.

Preparation of Pigment Dispersion Liquid:

Introduced amount of functional group in pigment A pigment dispersion liquid was diluted with pure water in such a manner that the content of a pigment (solids), which is an object of measurement, is about 0.03% to prepare a liquid A. The pigment dispersion liquid was then ultracentrifuged under conditions of 5° C., 80,000 rpm and 15 hours to collect a supernatant liquid from which the phosphonic acid type self-dispersible pigment had been removed, and this liquid was diluted about 80 times with pure water to prepare a liquid B. With respect to the thus prepared liquids A and B, the quantity of phosphorus was determined by means of an ICP emission spectral analyzer (trade name "SPS5100", manufactured by SII Nano Technology Co.). The amount of the phosphonic acid group was then determined from a difference in the amount of phosphorus between the liquids A and B, and this amount was divided by the number of phosphonic acid groups contained in one functional group to calculate the amount of the functional group bonded to the particle surface of the pigment. (introduced amount of functional group)

Pigment Dispersion Liquid 1

Thirty-four grams (104 mmol) of an alendronate and 150 mL of pure water were placed in a 500-mL beaker to adjust the pH of the resultant liquid to 11 with a concentrated aqueous solution of sodium hydroxide, thereby dissolving the alendronate. Monosodium ((4-amino-1-hydroxybutane-1,1-diyl)bisphosphonate (product of Zentiva CO.) was used as the alendronate. Twenty-five grams (110 mmol) of nitrophenylsulfonyl chloride dissolved in 100 mL of tetrahydrofuran was then added dropwise into this solution. Upon the drop addition, an aqueous solution of sodium hydroxide was additionally added to keep the pH of the liquid at 10 to 11. After completion of the drop addition, this liquid was stirred additionally for 2 hours at room temperature. After tetrahydrofuran was evaporated in vacuum, the pH was adjusted to 4 to precipitate solids. After cooling overnight at 4° C., the solids were separated by filtration, washed with pure water and dried to obtain sodium (4-(4-aminobenzenesulfonylamino)-1-hydroxybutane-1,1-diyl)bisphosphonate.

Twenty grams of carbon black, 3 mmol of sodium (4-(4-aminobenzenesulfonylamino)-1-hydroxybutane-1,1-diyl) bisphosphonate (treatment agent), 20 mmol of nitric acid and 200 mL of pure water were mixed. That having a specific surface area of 220 $m^2/g$ and a DBP oil absorption of 105 mL/100 g was used as the carbon black, and the mixing was performed at room temperature and 6,000 rpm by means of a Silverson mixer. After 30 minutes, 20 mmol of sodium nitrite dissolved in a small amount of water was slowly added. The temperature of the resultant mixture was raised to 60° C. by mixing, and a reaction was conducted for 1 hour in this state. Thereafter, the pH of the mixture was adjusted to 10 with an aqueous solution of sodium hydroxide. After 30 minutes, 20 mL of pure water was added, diafiltration was conducted by means of a spectrum membrane to obtain a dispersion liquid in such manner that the content of the pigment is 10.0%. A pigment dispersion liquid 1 in which a self-dispersible pigment, to the particle surface of which a (4-(4-aminobenzene-sulfonylamino)-1-hydroxybutane-1,1-diyl)bisphosphonic acid group whose counter ion was a sodium ion was bonded was dispersed in water was obtained in this manner. The introduced amount of functional group of the self-dispersible pigment was 0.15 mmol/g.

Pigment Dispersion Liquid 2

A pigment dispersion liquid 2 in which a self-dispersible pigment, to the particle surface of which a ((4-aminobenzoylamino)methane-1,1-diyl)bisphosphonic acid group whose counter ion was a sodium ion was bonded was dispersed in water was obtained in the same manner as in the preparation of the pigment dispersion liquid 1 except that the kind of the treatment agent was changed to sodium ((4-aminobenzoylamino)methane-1,1-diyl)bisphosphonate. The introduced amount of functional group of the self-dispersible pigment was 0.15 mmol/g.

Pigment Dispersion Liquid 3

A pigment dispersion liquid 3 in which a self-dispersible pigment, to the particle surface of which a benzenephosphonic acid group whose counter ion is a sodium ion was bonded was dispersed in water was obtained in the same manner as in the preparation of the pigment dispersion liquid 1 except that the kind of the treatment agent was changed to 3 mmol of 4-aminobenzylphosphonic acid (product of Sigma-Aldrich Co.). The introduced amount of functional group of the self-dispersible pigment was 0.16 mmol/g.

Pigment Dispersion Liquid 4

The same operation as in the preparation of the pigment dispersion liquid 1 was conducted except that the counter ion was changed from the sodium ion to a potassium ion by an ion-exchange method. A pigment dispersion liquid 4 in which a self-dispersible pigment, to the particle surface of which a (4-(4-aminobenzenesulfonylamino)-1-hydroxybutane-1,1-diyl)bisphosphonic acid group whose counter ion was the potassium ion was bonded was dispersed in water was obtained by this operation. The introduced amount of functional group of the self-dispersible pigment was 0.15 mmol/g.

Pigment Dispersion Liquid 5

The same operation as in the preparation of the pigment dispersion liquid 1 was conducted except that the counter ion was changed from the sodium ion to an ammonium ion by the ion-exchange method. A pigment dispersion liquid 5 in which a self-dispersible pigment to the particle surface of which a (4-(4-aminobenzenesuifonylamino)-1-hydroxybutane-1, 1-diyl)bisphosphonic acid group whose counter ion was the ammonium ion was bonded was dispersed in water was obtained by this operation. The introduced amount of functional group of the self-dispersible pigment was 0.15 mmol/g.

Pigment Dispersion Liquid 6

The same operation as in the preparation of the pigment dispersion liquid 1 was conducted except that the counter ion was changed from the sodium ion to a lithium ion by the ion-exchange method. A pigment dispersion liquid 6 in which a self-dispersible pigment to the particle surface of which a (4-(4-aminobenzenesulfonylamino)-1-hydroxybutane-1,1-diyl)bisphosphonic acid group whose counter ion was the lithium ion was bonded was dispersed in water was obtained by this operation. The introduced amount of functional group of the self-dispersible pigment was 0.15 mmol/g.

Pigment Dispersion Liquid 7

A solution obtained by dissolving 5 g of concentrated hydrochloric acid in 5.5 g of water was cooled to 5° C., and then 1.5 g of 4-aminophthalic acid (treatment agent) was added to the solution. A container containing this solution was placed in an ice bath, and a solution obtained by dissolving 2.2 g of sodium nitrite in 9 g of water at 5° C. was added to this solution while keeping the temperature of the solution to 10° C. or less by stirring the solution. After this solution was stirred for 15 minutes, 6 g (solid content) of carbon black (specific surface area: 220 $m^2$/g, DBP oil absorption: 105 mL/100 g) was added to this solution under stirring. After stirring was conducted additionally for 15 minutes, the resultant slurry was filtered through filter paper (trade name "Standard Filter Paper No. 2", product of Advantec Co.), and the resultant particles were fully washed with water and dried in an oven of 110° C. Water was added to the dried product thus obtained in such a manner that the content of the pigment is 10.0%, thereby obtaining a dispersion liquid. In this manner, a pigment dispersion liquid 7 in which a self-dispersible pigment to the particle surface of which a phthalic acid group whose counter ion was a sodium ion was bonded was dispersed in water was obtained. The introduced amount of functional group of the self-dispersible pigment was 0.68 mmol/g. The introduced amount of functional group of the self-dispersible pigment was obtained by conversion from a sodium ion concentration in the pigment dispersion liquid 7 as measured by means of an ion meter (manufactured by DKK Co.).

Pigment Dispersion Liquid 8

The same operation as in the preparation of the pigment dispersion liquid 7 was conducted except that the counter ion was changed from the sodium ion to a potassium ion by an ion-exchange method. A pigment dispersion liquid 8 in which a self-dispersible pigment, to the particle surface of which a phthalic acid group whose counter ion was the potassium ion was bonded was dispersed in water was obtained by this operation. The introduced amount of functional group of the self-dispersible pigment was 0.68 mmol/g.

Preparation of First Ink:

After the components (unit: %) shown in the upper part of Table 1 were mixed and sufficiently stirred, the resultant respective mixtures were filtered under pressure through a polypropylene filter (product of Pall Co.) having a pore size of 2.5 μm, thereby preparing respective inks. In Table 1, "Surfynol 465" is an acetylene glycol ethylene oxide adduct produced by Air Products Co. and is a surfactant, the number of moles of the ethylene oxide group added to which is 10. In addition, "NIKKOL BL-9EX" is a polyoxyethylene lauryl ether produced by Nikko Chemicals Co., Ltd. and is a surfactant whose HLB value is 14.5 as determined by the Griffin's method, and the number of moles of the ethylene oxide group added to which is 9. Further, contents x (%) of pigments and redispersion viscosities of the respective inks are shown in the lower part of Table 1. The redispersion viscosity of each ink was measured by means of a viscometer (trade name "RE-85L", manufactured by TOKI SANGYO Co.; rotor used: 1°34×R24) and regarded the case of 5 mPa·s or less and the case exceeding 5 mPa·s as "A" and "B", respectively.

TABLE 1

Composition and properties of first ink

| | First ink | | | | | | | | | | | | | | | | |
|---|---|---|---|---|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 | 1-13 | 1-14 | 1-15 | 1-16 | 1-17 |
| Pigment dispersion liquid 1 | 30.00 | | 30.00 | 30.00 | | | | | 58.00 | 60.00 | | | 30.00 | 30.00 | | 25.00 | |
| Pigment dispersion liquid 2 | | 30.00 | | | | | | | | | | | | | | | |
| Pigment dispersion liquid 3 | | | | | 30.00 | | | | | | | | | | | | |
| Pigment dispersion liquid 4 | | | | | | 30.00 | | | | | | | | | | | |
| Pigment dispersion liquid 5 | | | | | | | 30.00 | | | | | | | | 30.00 | | |
| Pigment dispersion liquid 6 | | | | | | | | 30.00 | | | | | | | | | |
| Pigment dispersion liquid 7 | | | | | | | | | | | 30.00 | | | | | | 50.00 |
| Pigment dispersion liquid 8 | | | | | | | | | | | | 30.00 | | | | | |
| Glycerol | 6.50 | 6.50 | 6.50 | 5.00 | 6.50 | 6.50 | 6.50 | 6.50 | 6.50 | 6.50 | 6.50 | 6.50 | 12.50 | 7.50 | 15.00 | 6.50 | 25.00 |
| 2-Pyrrolidone | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | |
| Triethylene glycol | 8.50 | 8.50 | 8.50 | 8.50 | 8.50 | 8.50 | 8.50 | 8.50 | 8.50 | 8.50 | 8.50 | 8.50 | 12.50 | 7.50 | 3.00 | 8.50 | |

TABLE 1-continued

Composition and properties of first ink

| | First ink | | | | | | | | | | | | | | | | |
|---|---|---|---|---|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 | 1-13 | 1-14 | 1-15 | 1-16 | 1-17 |
| Surfynol 465 | 0.15 | 0.15 | | 0.15 | 0.15 | 0.15 | 0.15 | 0.15 | 0.15 | 0.15 | 0.15 | | | | | | 5.00 |
| Dipropylene glycol propyl ether | | | | | | | | | | | | 0.15 | 0.15 | 0.15 | | 0.15 | |
| NIKKOL BL-9EX | | | 0.15 | | | | | | | | | | | | 0.15 | | |
| Sodium sulfate | | | | 0.11 | | | | | | | | | | 0.36 | | | |
| Ammonium phthalate | | | | | | | | | | | | | | | | 0.30 | |
| Pure water | 49.85 | 49.85 | 49.85 | 54.74 | 49.85 | 49.85 | 49.85 | 49.85 | 21.85 | 19.85 | 49.85 | 49.85 | 39.85 | 49.49 | 46.55 | 54.85 | 20.00 |
| Content x of pigment (%) | 3.00 | 3.00 | 3.00 | 3.00 | 3.00 | 3.00 | 3.00 | 3.00 | 5.80 | 6.00 | 3.00 | 3.00 | 3.00 | 3.00 | 3.00 | 2.50 | 5.00 |
| Redispersion viscosity | A | A | A | A | A | A | A | A | A | A | A | A | B | B | B | A | B |

Preparation Dye Solution:

After their corresponding anionic dyes shown in Table 2 were dissolved in water, an acid was added to the resultant solutions to precipitate crystals of the dyes. Each precipitated crystal was collected by filtration to obtain a cake of the dye of a free acid form. ion-exchanged water and a proper amount of an aqueous alkaline solution (aqueous solution of lithium hydroxide, aqueous solution of sodium hydroxide or aqueous solution of potassium hydroxide) were added to the resultant cake to change the anionic group of the dye to a salt form, i.e., change the counter ion thereof to a monovalent cation, thereby dissolving the dye in water. In this manner, each dye solution whose dye content was 10.0% was prepared. The number of anionic groups in the respective anionic dyes is 2 for C.I. Direct Yellow 132, 4 for C.I. Direct Yellow, 2 for C.I. Acid Red 289 and 1 to 2 for C.I. Direct Blue 199.

The respective dye solutions thus prepared were diluted with pure water in such a manner that the content of the dye is 0.04% to determine concentrations of various monovalent cations by means of an ICP emission spectral analyzer (trade name "SPS5100", manufactured by SII Co.). The concentration of an ammonium ion among the monovalent cations was measured by means of an ion chromatograph (trade name "DX320", manufactured by Dionex Co.). The cation concentration (mol/L) when the dye content was 5.00% was calculated from the cation concentrations thus determined.

TABLE 2

Properties of dye solution (cation concentration when dye content is 5.00%)

| | | Cation concentration [mol/L] | | | |
|---|---|---|---|---|---|
| | Kind of dye | Li+ | Na+ | K− | Monovalent cation |
| Dye solution | 1 C.I. Direct Yellow 132 | 0.054 | 0.036 | | 0.090 |
| | 2 C.I. Direct Yellow 86 | 0.054 | 0.036 | | 0.090 |
| | 3 C.I. Acid Red 289 | 0.054 | 0.036 | | 0.090 |
| | 4 C.I. Direct Blue 199 | 0.054 | 0.036 | | 0.090 |
| | 5 C.I. Direct Yellow 132 | 0.030 | 0.020 | | 0.050 |
| | 6 C.I. Direct Yellow 132 | 0.036 | 0.024 | 0.030 | 0.090 |
| | 7 C.I. Direct Yellow 132 | 0.041 | 0.050 | | 0.091 |
| | 8 C.I. Direct Yellow 132 | 0.077 | 0.014 | | 0.091 |
| | 9 C.I. Direct Yellow 132 | 0.090 | | | 0.090 |
| | 10 C.I. Direct Yellow 132 | | 0.090 | | 0.090 |
| | 11 C.I. Direct Yellow 132 | 0.024 | 0.016 | | 0.040 |
| | 12 C.I. Direct Yellow 132 | 0.036 | 0.054 | | 0.090 |
| | 13 C.I. Direct Yellow 132 | 0.081 | 0.009 | | 0.090 |

TABLE 2-continued

Properties of dye solution (cation concentration when dye content is 5.00%)

| | Cation concentration [mol/L] | | | |
|---|---|---|---|---|
| Kind of dye | Li+ | Na+ | K− | Monovalent cation |
| 14 C.I. Direct Yellow 132 | 0.080 | 0.120 | | 0.200 |
| 15 C.I. Direct Blue 199 | | 0.090 | | 0.090 |

Preparation of Second Ink:

After the components (unit: %) shown in the upper part of Table 3 were mixed and sufficiently stirred, the resultant respective mixtures were filtered under pressure through a microfilter (product of Advantec) having a pore size of 0.2 μm, thereby preparing respective inks. In Table 3, "Surfynol 465" is an acetylene glycol ethylene oxide adduct produced by Air Products Co. and is a surfactant the number of moles of the ethylene oxide group added to which is 10.

The $Li^+$ concentration, the $Na^+$ concentration, the concentration of any other monovalent cation, the total concentration M of $Li^+$ and $Na^+$ and the total concentration of the monovalent cations (all units are mol/L) are shown in the lower part of Table 3. In addition, "$Li^+/(Li^++Na^+)\times100(\%)$" is shown in the lower part of Table 3. Incidentally, the concentrations of various monovalent cations were measured by means of an ICP emission spectral analyzer (trade name "SPS5100", manufactured by SIT Co.). In addition, the concentration of an ammonium ion among the monovalent cations was measured by means of an ion chromatograph (trade name "DX320", manufactured by Dionex Co.). With respect to the respective inks, the concentration of polyvalent cations including polyvalent metal ions was measured by means of the above-mentioned ion chromatograph. As a result, in Ink 2-22, the concentration was 4,000 ppm. However, in all of the other second inks, the concentration was 10 ppm or less. The pH of the respective inks was measured by means of a pH meter (trade name "Disktop Type pH Meter F-21", manufactured by HORIBA, Ltd. Co.). As a result, in Ink 2-23, the pH was 5.5. However, in all of the other inks, the pH was 6 or more.

TABLE 3

Composition and properties of second ink

| | Second ink | | | | | | | | | | | |
|---|---|---|---|---|---|---|---|---|---|---|---|---|
| | 2-1 | 2-2 | 2-3 | 2-4 | 2-5 | 2-6 | 2-7 | 2-8 | 2-9 | 2-10 | 2-11 | 2-12 |
| No. of dye solution | 1 | 2 | 3 | 4 | 5 | 6 | 1 | 1 | 5 | 7 | 8 | 1 |
| Dye solution | 50.00 | 50.00 | 50.00 | 50.00 | 50.00 | 50.00 | 50.00 | 50.00 | 50.00 | 50.00 | 50.00 | 50.00 |
| Glycerol | 10.00 | 10.00 | 10.00 | 10.00 | 10.00 | 10.00 | 10.00 | 10.00 | 10.00 | 10.00 | 10.00 | 10.00 |
| 2-Pyrrolidone | 5.00 | 5.00 | 5.00 | 5.00 | 5.00 | 5.00 | 5.00 | 5.00 | 5.00 | 5.00 | 5.00 | 5.00 |
| 1,5-Pentanediol | 8.00 | 8.00 | 8.00 | 8.00 | 8.00 | 8.00 | 8.00 | 8.00 | 8.00 | 8.00 | 8.00 | 8.00 |
| Surfynol 465 | 1.00 | 1.00 | 1.00 | 1.00 | 1.00 | 1.00 | 1.00 | 1.00 | 1.00 | 1.00 | 1.00 | 1.00 |
| Lithium acetate | | | | | 0.158 | | | | | | | 0.436 |
| Sodium acetate | | | | | 0.131 | | | | | | | 0.361 |
| Potassium acetate | | | | | | | 1.08 | | | | | |
| Ammonium acetate | | | | | | | | 0.85 | | | | |
| Magnesium sulfate | | | | | | | | | | | | |
| Acetic acid | | | | | | | | | | | | |
| Ion-Exchanged water | Bal. | Bal. | Bal. | Bal. | Bal. | Bal. | Bal. | Bal. | Bal. | Bal. | Bal. | Bal. |
| $Li^+$ concentration (mol/L) | 0.054 | 0.054 | 0.054 | 0.054 | 0.054 | 0.036 | 0.054 | 0.054 | 0.030 | 0.041 | 0.077 | 0.120 |
| $Na^+$ concentration (mol/L) | 0.036 | 0.036 | 0.036 | 0.036 | 0.036 | 0.024 | 0.036 | 0.036 | 0.020 | 0.050 | 0.014 | 0.080 |
| Concentration of the other monovalent cations (mol/L) | | | | | | 0.030 | 0.110 | 0.110 | | | | |
| $Li^+ + Na^+$ concentratio M (mol/L) | 0.090 | 0.090 | 0.090 | 0.090 | 0.090 | 0.060 | 0.090 | 0.090 | 0.060 | 0.091 | 0.091 | 0.200 |
| Total concentration of monovalent cations (mol/L) | 0.090 | 0.090 | 0.090 | 0.090 | 0.090 | 0.090 | 0.200 | 0.200 | 0.050 | 0.091 | 0.091 | 0.200 |
| $Li^+/(Li^+ + Na^+) \times 100$ (%) | 60 | 60 | 60 | 60 | 60 | 60 | 60 | 60 | 60 | 45 | 85 | 60 |

| | Second ink | | | | | | | | | | |
|---|---|---|---|---|---|---|---|---|---|---|---|
| | 2-13 | 2-14 | 2-15 | 2-16 | 2-17 | 2-18 | 2-19 | 2-20 | 2-21 | 2-22 | 2-23 |
| No. of dye solution | 1 | 1 | 1 | 9 | 10 | 11 | 12 | 13 | 14 | 15 | 15 |
| Dye solution | 50.00 | 50.00 | 50.00 | 50.00 | 50.00 | 50.00 | 50.00 | 50.00 | 50.00 | 50.00 | 35.00 |
| Glycerol | 10.00 | 10.00 | 10.00 | 10.00 | 10.00 | 10.00 | 10.00 | 10.00 | 10.00 | 10.00 | 5.00 |
| 2-Pyrrolidone | 5.00 | 5.00 | 5.00 | 5.00 | 5.00 | 5.00 | 5.00 | 5.00 | 5.00 | 5.00 | 7.00 |
| 1,5-Pentanediol | 8.00 | 8.00 | 8.00 | 8.00 | 8.00 | 8.00 | 8.00 | 8.00 | 8.00 | 8.00 | 5.00 |
| Surfynol 465 | 1.00 | 1.00 | 1.00 | 1.00 | 1.00 | 1.00 | 1.00 | 1.00 | 1.00 | 1.00 | 1.00 |
| Lithium acetate | 0.475 | | | | | | | | | | |
| Sodium acetate | 0.394 | | | | | | | | | | 0.50 |
| Potassium acetate | | 3.04 | 3.14 | | | | | | | | |
| Ammonium acetate | | | | | | | | | | | |
| Magnesium sulfate | | | | | | | | | | 2.50 | |
| Acetic acid | | | | | | | | | | | 0.65 |
| Ion-Exchanged water | Bal. | Bal. | Bal. | Bal. | Bal. | Bal. | Bal. | Bal. | Bal. | Bal. | Bal. |
| $Li^+$ concentration (mol/L) | 0.126 | 0.054 | 0.054 | 0.090 | | 0.024 | 0.036 | 0.081 | 0.080 | 0.054 | |
| $Na^+$ concentration (mol/L) | 0.084 | 0.036 | 0.036 | | 0.090 | 0.016 | 0.054 | 0.009 | 0.120 | 0.036 | 0.124 |
| Concentration of the other monovalent cations (mol/L) | | 0.310 | 0.320 | | | | | | | | |
| $Li^+ + Na^+$ concentratio M (mol/L) | 0.210 | 0.090 | 0.090 | 0.090 | 0.090 | 0.040 | 0.090 | 0.090 | 0.200 | 0.090 | 0.124 |
| Total concentration of monovalent cations (mol/L) | 0.210 | 0.400 | 0.410 | 0.090 | 0.090 | 0.040 | 0.090 | 0.090 | 0.200 | 0.090 | 0.124 |
| $Li^+/(Li^+ + Na^+) \times 100$ (%) | 60 | 60 | 60 | 100 | 0 | 60 | 40 | 90 | 40 | 60 | 0 |

Evaluation:

The respective inks obtained above were filled into ink cartridges to provide ink sets of respective constitutions shown on the left side of Table 4. Respective x/M values are also shown in Table 4. The first ink and the second in each ink set were set at a position of a black ink and a position of a color ink in an ink jet recording apparatus (trade name "PIXUS MP480", manufactured by Canon Inc.) in which a recording head which ejects an ink by thermal energy was installed, respectively. Incidentally, the resolution of this ink jet recording apparatus is 600 dpi by 600 dpi. In addition, the condition that "the recording duty is 100%" is defined as follows. With respect of a black ink, such a condition that one ink droplet whose mass is 25 ng±10% is applied to a unit region of 1/600 in. by 1/600 in. is defined as "recording duty being 100%". In addition, with respect to a color ink, such a condition that two ink droplets (mass of each droplet being 5.5 ng±10%) are applied to a unit region of 1/600 in. by 1/600 in. is defined as "recording duty being 100%". Respective evaluation results are shown in Table 4. In the present invention, in the evaluation criteria of the following respective evaluation items, "AA", "A" and "B" were regarded as acceptable levels, and "C" was regarded as an unacceptable level.

Optical Density of Image Recorded with First Ink

The first ink was used to record a solid image (2 cm by 2 cm/line) with a recording duty of 100% on the following four recording media (plain paper).

Recording Media

PB PAPAR (product of Canon Inc.)

SW-101 (product of Canon Inc.)

Xerox 4200 Premium Multipurpose White Paper (product of Xerox Co.)

Bright White Inkjet Paper (product of Hewlett Packard Co.)

One day after the recording, optical densities of the solid images recorded on the four recording media were measured by means of a reflection densitometer (trade name "Macbeth RD-918", manufactured by Macbeth Co.) to calculate the average value thereof, thereby evaluating the optical density of each image according to the following evaluation criteria.

AA: The average value was 1.45 or more;
A: The average value was 1.40 or more and less than 1.45;
B: The average value was 1.35 or more and less than 1.40;
C: The average value was less than 1.35.

Bleeding Resistance

The first ink was used to record a solid image (0.5 mm in length by 2 cm in width) with a recording duty of 100% on a recording medium (trade name "SW-101, product of Canon Inc.). In addition, the second ink was used to record solid images (2 mm in length by 2 cm in width) with a recording duty of 70% adjoiningly on left and right sides of the solid image recorded with the first ink. Boundary portions between the solid images recorded were visually observed to evaluate the bleeding resistance according to the following evaluation criteria.
A: No bleeding was observed;
B: Bleeding occurred, but was scarcely conspicuous;
C: Bleeding considerably occurred.

Inhibition of Retention of First Ink in Cap

Each first ink was placed in a Petri dish to prepare a liquid in which 10% of the ink has been evaporated (concentrated ink). The concentrated ink thus prepared was used to record a black solid image (26 cm in length by 20 cm in width) with a recording duty of 7% on 10,000 to 15,000 sheets of A4-sized recording medium at intervals of 4 minutes under conditions of 30° C. temperature and 10% relative humidity. The inhibition of the retention of the first ink in the cap was then evaluated according to the following evaluation criteria. Upon the recording, 0.2 mg±10% of the ink was preliminarily ejected on the cap before the recording, and such a cleaning operation that 0.1 g±30% of the ink is sucked through the cap capping the ejection orifice of the recording head was performed at a frequency of once per 200 recording media. Incidentally, the reason why the concentrated ink was used is that the ink retention in the cap is evaluated under severer conditions.
A: No retention of the ink in the cap was observed even after the recording on 15,000 sheets of recording medium;
B: No retention of the ink in the cap was observed even after the recording on 10,000 sheets of recording medium, but retention of the ink in the cap was observed after the recording on 15,000 sheets of recording medium;
C: Retention of the ink in the cap was observed after the recording on 10,000 sheets of recording medium.

Irregular Ejection

A nozzle-check pattern of the ink jet recording apparatus was recorded on a recording medium (trade name "High-Grade Exclusive Paper HR-101", product of Canon Inc.). Solid images (26 cm in length by 20 cm in width) of the first ink and the second ink with a recording duty of 7% were then continuously recorded on 7,000 sheets of A4-sized recording medium. Thereafter, the nozzle-check pattern of the ink jet recording apparatus was again recorded on a recording medium. The second nozzle check pattern recorded on the recording medium was visually observed to evaluate the irregular ejection according to the following evaluation criterion.
A: No irregular ejection occurred in both first and second inks;
B: The irregular ejection occurred in any one of the first and second inks, but no problem is caused on the image recording:
C: The irregular ejection occurred in any one of the first and second inks, and a problem was caused on the image recording.

TABLE 4

Constitution and evaluation results of in set

| | | First ink | Second ink | x/M value | Optical density of image (*1) | Bleeding resistance | Inhibition of retention in cap (*1) | Irregular ejection |
|---|---|---|---|---|---|---|---|---|
| Ex. | 1 | 1-1 | 2-1 | 33 | AA | A | A | A |
| | 2 | 1-2 | 2-1 | 33 | AA | A | A | A |
| | 3 | 1-3 | 2-1 | 33 | AA | A | A | A |
| | 4 | 1-4 | 2-1 | 33 | AA | A | A | A |
| | 5 | 1-1 | 2-2 | 33 | AA | A | A | A |
| | 6 | 1-1 | 2-3 | 33 | AA | A | A | A |
| | 7 | 1-1 | 2-4 | 33 | AA | A | A | A |
| | 8 | 1-1 | 2-5 | 33 | AA | A | A | A |
| | 9 | 1-1 | 2-6 | 50 | AA | A | A | A |
| | 10 | 1-1 | 2-7 | 33 | AA | A | A | A |
| | 11 | 1-1 | 2-8 | 33 | AA | A | A | A |
| | 12 | 1-1 | 2-9 | 50 | AA | A | A | A |
| | 13 | 1-1 | 2-10 | 33 | AA | A | A | A |
| | 14 | 1-1 | 2-11 | 33 | AA | A | A | A |
| | 15 | 1-1 | 2-12 | 15 | AA | A | A | A |
| | 16 | 1-1 | 2-13 | 14 | AA | A | A | B |
| | 17 | 1-1 | 2-14 | 33 | AA | A | A | A |
| | 18 | 1-1 | 2-15 | 33 | AA | A | A | B |
| | 19 | 1-5 | 2-1 | 33 | A | A | A | A |
| | 20 | 1-6 | 2-1 | 33 | AA | A | A | A |
| | 21 | 1-7 | 2-1 | 33 | AA | A | A | A |
| | 22 | 1-8 | 2-1 | 33 | AA | A | B | B |
| | 23 | 1-9 | 2-1 | 64 | AA | A | A | A |
| | 24 | 1-10 | 2-1 | 67 | AA | B | A | A |
| Comp. Ex. | 1 | 1-11 | 2-1 | 33 | C | A | A | A |
| | 2 | 1-12 | 2-1 | 33 | C | A | A | A |
| | 3 | 1-13 | 2-1 | 33 | AA | B | C | A |
| | 4 | 1-14 | 2-1 | 33 | AA | A | C | C |
| | 5 | 1-15 | 2-1 | 33 | AA | A | C | C |
| | 6 | 1-1 | 2-16 | 33 | AA | B | A | C |

TABLE 4-continued

Constitution and evaluation results of in set

| | | Constitution of ink set | | Evaluation Results | | | |
|---|---|---|---|---|---|---|---|
| | First ink | Second ink | x/M value | Optical density of image (*1) | Bleeding resistance | Inhibition of retention in cap (*1) | Irregular ejection |
| 7 | 1-1 | 2-17 | 33 | AA | B | A | C |
| 8 | 1-1 | 2-18 | 75 | AA | C | A | A |
| 9 | 1-16 | 2-18 | 63 | AA | C | A | A |
| 10 | 1-1 | 2-19 | 33 | AA | A | A | C |
| 11 | 1-1 | 2-20 | 33 | AA | A | A | C |
| 12 | 1-1 | 2-21 | 15 | AA | A | A | C |
| 13 | 1-17 | 2-1 | 56 | C | A | C | A |
| Ref. Ex. 1 | 1-1 | 2-22 | 33 | AA | A | A | C |
| 2 | 1-1 | 2-23 | 24 | AA | A | A | C |

(*1) First ink

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-241113, filed Nov. 28, 2014, which is hereby incorporated by reference herein in its entirety.

What is claimed is:

1. An aqueous ink set for ink jet comprising a combination of a first ink and a second ink,
   wherein the first ink includes a self-dispersible pigment to a particle surface of which a functional group that includes a phosphonic acid group is bonded, and a redispersion viscosity of the first ink as measured according to the following procedure is 5 mPa·s or less,
   wherein measurement of the redispersion viscosity being such that after 1.5 g of the first ink is stored for 15 hours under a temperature of 30° C. and a relative humidity of 10%, the first ink is added thereto in an amount of the thus-reduced mass followed by additional storing for 2 hours to thereby measure the viscosity of the resultant,
   wherein the second ink includes an anionic dye, a lithium ion, and a sodium ion, and a total concentration of the lithium ion and the sodium ion in the second ink is 0.050 mol/L or more, and
   wherein a proportion of a concentration of the lithium ion in the total concentration of the lithium ion and the sodium ion in the second ink is 45% or more to 85% or less.

2. The aqueous ink set according to claim 1, wherein the total concentration of the lithium ion and the sodium ion in the second ink is 0.200 mol/L or less.

3. The aqueous ink set according to claim 1, wherein a total concentration of monovalent cations in the second ink is 0.400 mol/L or less.

4. The aqueous ink set according to claim 1, wherein the functional group bonded to the particle surface of the self-dispersible pigment includes two phosphonic acid groups.

5. The aqueous ink set according to claim 1, wherein a counter ion of the functional group bonded to the particle surface of the self-dispersible pigment includes at least one of a sodium ion, a potassium ion, and an ammonium ion.

6. The aqueous ink set according to claim 1, wherein the content x(% by mass) of the self-dispersible pigment in the first ink and the total concentration M (mol/L) of the lithium ion and the sodium ion in the second ink satisfy the relation of the following expression (1):

$$x/M \leq 65 \qquad \ldots (1).$$

7. The aqueous ink set according to claim 1, wherein a molecular weight of the functional group is 1,500 or less.

8. The aqueous ink set according to claim 1, wherein an introduced amount of the functional group is 0.08 mmol/g or more to 0.33 mmol/g or less.

9. The aqueous ink set according to claim 1, wherein a structure of the functional group is —$C_6H_4$—CONH—CH($PO_3[M_1]_2)_2$ or —$C_6H_4$—$SO_2$—NH—$C_3H_6$—C(OH)($PO_3[M_1]_2)_2$, where $M_1$ is a sodium ion, a potassium ion, or an ammonium ion.

10. The aqueous ink set according to claim 1, wherein the content (% by mass) of the pigment in the first ink is 1.00% by mass or more to 10.00% by mass or less based on the total mass of the ink.

11. The aqueous ink set according to claim 1, wherein the content (% by mass) of the anionic dye in the second ink is 1.00% by mass or more to 6.00% by mass or less based on the total mass of the ink.

12. The aqueous ink set according to claim 6, wherein x/M is 15 or more.

13. An ink jet recording method comprising:
   a step of ejecting an ink from an ejection orifice of a recording head of an ink jet system to record an image on a recording medium; and
   a step of capping the ejection orifice with a cap,
   wherein the ink comprises an ink included in an aqueous ink set for ink jet which comprises a combination of a first ink and a second ink,
   wherein the first ink includes a self-dispersible pigment to a particle surface of which a functional group that includes a phosphonic acid group is bonded, and a redispersion viscosity of the first ink as measured according to the following procedure is 5 mPa·s or less,
   wherein measurement of the redispersion viscosity being such that after 1.5 g of the first ink is stored for 15 hours under a temperature of 30° C. and a relative humidity of 10%, the first ink is added thereto in an amount of the thus-reduced mass followed by additional storing for 2 hours to thereby measure the viscosity of the resultant,
   wherein the second ink includes an anionic dye, a lithium ion, and a sodium ion, and a total concentration of the lithium ion and the sodium ion in the second ink is 0.050mol/L or more, and wherein a proportion of a concentration of the lithium ion in the total concentration of the lithium ion and the sodium ion in the second ink is 45% or more to 85% or less.

14. An ink jet recording apparatus comprising:
an ink storage portion within which an ink is stored;
a unit for ejecting the ink from an ejection orifice of a recording head of an ink jet system to record an image on a recording medium; and
a cap for capping the ejection orifice,
wherein the ink comprises an ink included in an aqueous ink set for ink jet which comprises a combination of a first ink and a second ink,
wherein the first ink includes a self-dispersible pigment to a particle surface of which a functional group that includes a phosphonic acid group is bonded, and a redispersion viscosity of the first ink as measured according to the following procedure is 5 mPa·s or less,
wherein measurement of the redispersion viscosity being such that after 1.5 g of the first ink is stored for 15 hours under a temperature of 30° C. and a relative humidity of 10%, the first ink is added thereto in an amount of the thus-reduced mass followed by additional storing for 2 hours to thereby measure the viscosity of the resultant,
wherein the second ink includes an anionic dye, a lithium ion, and a sodium ion, and a total concentration of the lithium ion and the sodium ion in the second ink is 0.050 mol/L or more, and
wherein a proportion of a concentration of the lithium ion in the total concentration of the lithium ion and the sodium ion in the second ink is 45% or more to 85% or less.

* * * * *